(12) United States Patent
Zhang (10) Patent No.: US 12,328,213 B1
(45) Date of Patent: Jun. 10, 2025

(54) CARRIER FREQUENCY ESTIMATION FOR PROBABILISTIC SHAPED SIGNAL

(71) Applicant: ACACIA TECHNOLOGY, INC., San Jose, CA (US)

(72) Inventor: Hongbin Zhang, Maynard, MA (US)

(*) Notice: Subject to any disclaimer, the term of this patent is extended or adjusted under 35 U.S.C. 154(b) by 0 days.

(21) Appl. No.: 17/581,700

(22) Filed: Jan. 21, 2022

(51) Int. Cl.
*H04L 27/14* (2006.01)
*H04B 1/12* (2006.01)

(52) U.S. Cl.
CPC ............ *H04L 27/14* (2013.01); *H04B 1/123* (2013.01)

(58) Field of Classification Search
CPC .... H04B 1/123; H04B 1/0475; H04B 1/0042; H04B 1/7107; H04L 27/0014; H04L 27/2657; H04L 27/22; H04L 27/14
See application file for complete search history.

(56) References Cited

U.S. PATENT DOCUMENTS

| | | | | |
|---|---|---|---|---|
| 5,272,446 A * | 12/1993 | Chalmers | ............ | G01R 23/165 329/304 |
| 5,987,073 A * | 11/1999 | Knutson | ............... | H04L 7/0334 329/304 |
| 6,590,945 B1 * | 7/2003 | Brardjanian | ........ | H04L 27/2332 375/243 |
| 2002/0126748 A1 * | 9/2002 | Rafie | .................... | H04L 27/3818 375/229 |
| 2004/0207392 A1 * | 10/2004 | Kernhof | ............ | G01D 5/24404 324/207.2 |
| 2006/0007571 A1 * | 1/2006 | Pan | .................... | G11B 27/3027 360/39 |
| 2006/0291550 A1 * | 12/2006 | Wang | .................. | H04L 27/0014 375/232 |
| 2007/0189195 A1 * | 8/2007 | Belotserkovsky | .... | H03L 7/0807 375/238 |
| 2007/0268978 A1 * | 11/2007 | Kazakevich | ........ | H04L 27/3836 375/261 |
| 2009/0041161 A1 * | 2/2009 | Jian | ..................... | H04L 27/2662 370/208 |
| 2009/0147873 A1 * | 6/2009 | Li | ....................... | H04L 27/2676 375/260 |
| 2009/0220015 A1 * | 9/2009 | Fu | ....................... | H04L 27/2676 455/3.06 |
| 2009/0310656 A1 * | 12/2009 | Maltsev | .............. | H04L 27/2601 708/401 |
| 2017/0244589 A1 * | 8/2017 | Su | ....................... | H04L 27/3854 |

* cited by examiner

*Primary Examiner* — Khanh C Tran
(74) *Attorney, Agent, or Firm* — Patterson + Sheridan, LLP

(57) ABSTRACT

In part, the disclosure relates to a method of carrier frequency estimation. The method includes selecting a first group of symbols from a constellation of a carrier signal, wherein the first group includes one or more subgroups of symbols from the constellation; estimating a carrier frequency or carrier frequency offset of the carrier signal by approximating the carrier frequency offset as $\Delta f$, wherein $$\Delta f = \frac{1}{4}\mathrm{argmax}|DFT(\cos(\theta) + j\,\sin(\theta))|;$$

and determining $\cos(\theta)$ and $\sin(\theta)$ using a coordinate rotation digital computer (CORDIC) algorithm, wherein the CORDIC algorithm calculates rotation of a two-dimensional vector by $\theta$ using add and/or shift operations.

22 Claims, 8 Drawing Sheets

CARRIER FREQUENCY ESTIMATION FOR PROBABILISTIC SHAPED SIGNAL

FIELD

This disclosure relates generally to the field of digital signal processing in modern telecommunications.

BACKGROUND

Contemporary telecommunications systems make extensive use of digital signal processing techniques and algorithms that are advantageously implemented in hardware or software in various configurations for various purposes.

SUMMARY

In part, in one aspect, the disclosure relates to a method of carrier frequency estimation (CFE) and carrier phase estimation (CPE) that avoids the negative impact of a low occurrence of corner symbols in a constellation when compared with legacy CFE and CPE methods. In some embodiments, a low occurrence of corner symbols arises from probabilistic shaped quadrature amplitude modulation (PS-QAM) signals. In some embodiments, CFE may be based on a discrete Fourier transform (DFT) of a fourth power of a received symbol which, while removing data modulation, may introduce noise in an estimate of the carrier frequency. In some embodiments, the current disclosure normalizes the fourth power of the received symbol in CFE to reduce noise in the estimate of the carrier frequency. In some embodiments, the current disclosure implements the coordinate rotation digital computer (CORDIC) algorithm to efficiently compute determine or generate a complex number representing the normalized fourth power of a received symbol rather than implementing the inefficient division operation in ordinary normalization. In some embodiments, CFE may introduce a 180 degree phase shift on received symbols; in some embodiments, a received symbol is categorized based on the real part of fourth power of the complex value of the symbol, indicating whether a 180 degree phase shift will be compensated. In part, the disclosure relates to a method of carrier frequency estimation. The method includes selecting a first group of symbols from a constellation of a carrier signal, wherein the first group includes one or more subgroups of symbols from the constellation; estimating a carrier frequency or carrier frequency offset of the carrier signal by approximating the carrier frequency offset as $\Delta f$, wherein $$\Delta f = \frac{1}{4}\mathrm{argmax}|DFT(\cos(\theta) + j\,\sin(\theta))|;$$

and determining $\cos(\theta)$ and $\sin(\theta)$ using a coordinate rotation digital computer (CORDIC) algorithm, wherein the CORDIC algorithm calculates rotation of a two-dimensional vector by $\theta$ using add and/or shift operations.

In one embodiment, the one or more subgroups include a plurality of corner symbols, wherein the estimating and determining step are performed in real time. In one embodiment, the method further includes selecting symbols of the first group of symbols from first radius of the constellation. In one embodiment, the method further includes selecting symbols of the first group of symbols by a magnitude of a complex representation of each symbol. In one embodiment, the method further includes selecting symbols of the first group of symbols by a sign of real part of fourth power of the symbol of each symbol, wherein one or more symbols are a complex number. In one embodiment, the method further includes estimating phase angle $\theta$ of first group of symbols wherein $\theta = \mathrm{angle}(y^4)$ using CORDIC algorithm to generate $\cos(\theta)$ and $\sin(\theta)$ using a DSP in electrical communication with a receiver, wherein $|y|^2$ is in a first region of constellation. In one embodiment, the method further includes estimating phase angle $\theta$ of first group of symbols wherein $\theta = (\mathrm{angle}(y^4)+\pi)$ using CORDIC algorithm to generate $\cos(\theta)$ and $\sin(\theta)$ using a DSP in electrical communication with a receiver, wherein $|y|^2$ is in a second region of constellation.

In one embodiment, the CORDIC algorithm is performed using a DSP. In one embodiment, the DSP is a coherent DSP. In one embodiment, the DSP is in electrical communication with a receiver. In one embodiment, the DSP is a symbol rate DSP. In one embodiment, CORDIC algorithm is configured not to perform division or multiplication operations to maintain real time operation. In one embodiment, all steps of claim 1 are performed by a DSP that is in electrical communication with a symbol rate receiver. In one embodiment, $e^{j\theta}$ is evaluated as a step in the CORDIC algorithm. In one embodiment, values for $e^{j\theta}$ are obtained by a DSP from a look up table stored in memory, wherein the memory is in electrical communication with the DSP and a receiver.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, constellations and diagrams thereof, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Generally, a communications channel has a capacity limit that a certain application may approach asymptotically. Often, to approach channel capacity, next generation coherent transponders use probabilistically shaped (PS) signals and M-ary quadrature amplitude modulation (M-QAM) constellations with non-uniform symbol probabilities to encode transmitted data. Generally, an offset may exist between the carrier frequency of the transmitter, the frequency of the data actually transmitted, and the frequency to which the receiver is nominally tuned; as such, modern telecommunications receivers often implement carrier frequency estimation (CFE). However, in many embodiments, Applicant has realized that PS signals negatively affect the performance of standard carrier frequency estimation (CFE) and carrier phase estimation (CPE) methods in digital signal processing (DSP) systems.

Figure 1:
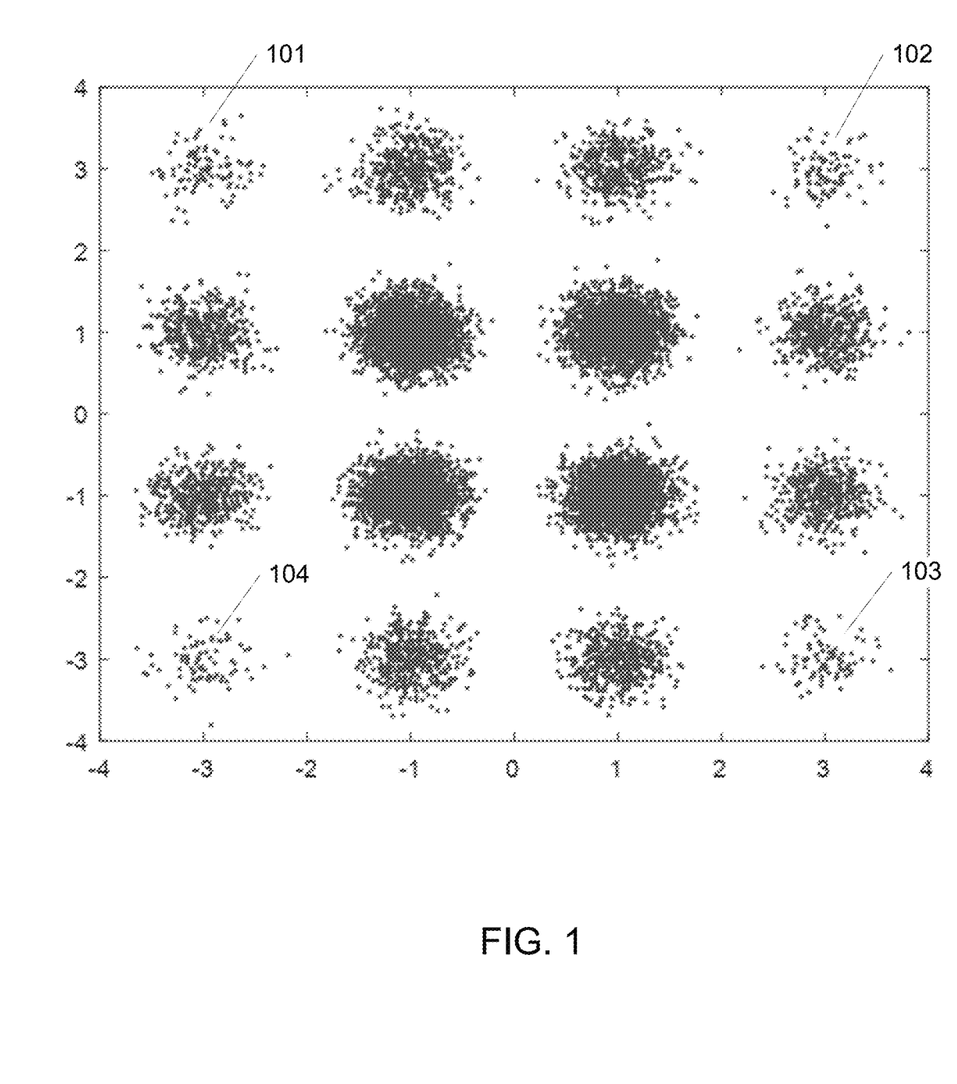
FIG. 1 represents an exemplary embodiment of the current disclosure wherein a probabilistically shaped 16-ary quadrature amplitude modulation (PS16QAM) constellation demonstrates the low occurrence of corner symbols in PS-QAM signals according to an exemplary embodiment of the disclosure.

In various embodiments, Applicant has realized that both the CFE and CPE DSP blocks rely on high occurrence of the four symbols at the corners of a constellation. In various embodiments, Applicant has realized that CFE and CPE DSP are severely impaired by PS signals because the corner symbols are less frequent in PS M-QAM constellations. Refer now to the exemplary embodiment of FIG. 1, wherein corner symbols 101-104 of a PS16QAM are of relatively low occurrence compared to symbols toward the center of the constellation. The probability of occurrence is correlated with the density of the points plotted in a given region. In certain embodiments, the current disclosure teaches a method to mitigate one or more negative effects of PS signals on CFE and CPE in DSP.

In most embodiments, Applicant has realized that CFE algorithms typically use the fourth power of the received symbols to remove data modulation and that the carrier frequency offset can be estimated by finding the frequency component that has maximum magnitude in the L-point Discrete Fourier Transform (DFT)

$$\Delta f = \frac{1}{4} \mathrm{argmax} |DFT(y^4)|$$

where $y^4 = [y^4(1), y^4(2), \ldots, y^4(L)]$ is a vector of length L of received signal sampled at the symbol rate and where each sample is raised to the fourth power. Similarly, in many embodiments, a CPE block may estimate residual carrier phase as:

$$\Delta\varphi = -\frac{1}{4}\mathrm{arg}[y^4].$$

Ordinary CFE and CPE implementations are especially dependent on the four corner symbols because the four corner symbols are quadrature phase shift keying (QPSK) symbols and because they have a high amplitude and therefore a high noise immunity. Consider the Table 1 below, wherein each of the 16 symbols from a 16QAM constellation are enumerated along with the probability of each symbol and the real and imaginary parts of the symbol's fourth power.

TABLE 1

| y | 1 + 1j | 1 − 1j | −1 + 1j | −1 − 1j | 1 + 3j | 1 − 3j | 3 + 1j | 3 − 1j |
|---|---|---|---|---|---|---|---|---|
| Pr(y) | 1/16 | 1/16 | 1/16 | 1/16 | 1/16 | 1/16 | 1/16 | 1/16 |
| Re(y$^4$) | −4 | −4 | −4 | −4 | 28 | 28 | 28 | 28 |
| Im(y$^4$) | 0 | 0 | 0 | 0 | −96 | 96 | 96 | −96 |

| y | −1 + 3j | −1 − 3j | −3 + 1j | −3 − 1j | 3 + 3j | 3 − 3j | −3 + 3j | −3 − 3j |
|---|---|---|---|---|---|---|---|---|
| Pr(y) | 1/16 | 1/16 | 1/16 | 1/16 | 1/16 | 1/16 | 1/16 | 1/16 |
| Re(y$^4$) | 28 | 28 | 28 | 28 | −324 | −324 | −324 | −324 |
| Im(y$^4$) | 96 | −96 | −96 | 96 | 0 | 0 | 0 | 0 |

Here the four corner symbols are 3+3j, 3−3j, −3+3j, and −3−3j and the magnitude of each of these is high (324) compared to the other symbols. However, in PS constellations where these symbols are less frequent, ordinary CFE and CPE algorithms are limited or inaccurate. In various embodiments, a method of resolving the negative impact of PS signals on CFE and CPE stages in DSP is disclosed.

In most embodiments, before carrier frequency and phase of the received symbols are compensated by CFE and CPE, a constellation may be axisymmetric; that is to say, symbols in a constellation may be categorized by radius lye. In most embodiments, received symbols are classified by radius |y| into regions and each region is further classified into two sets A and B such that, after carrier frequency and phase compensation, the sign of the real part of the fourth power of the symbol is negative in set A and positive in set B. A negative sign of the real part of the fourth power of the symbol is indicative of an induced 180 degree phase shift of the symbol that is removed in the argument of the DFT computation during frequency and phase compensation.

Figure 2A:
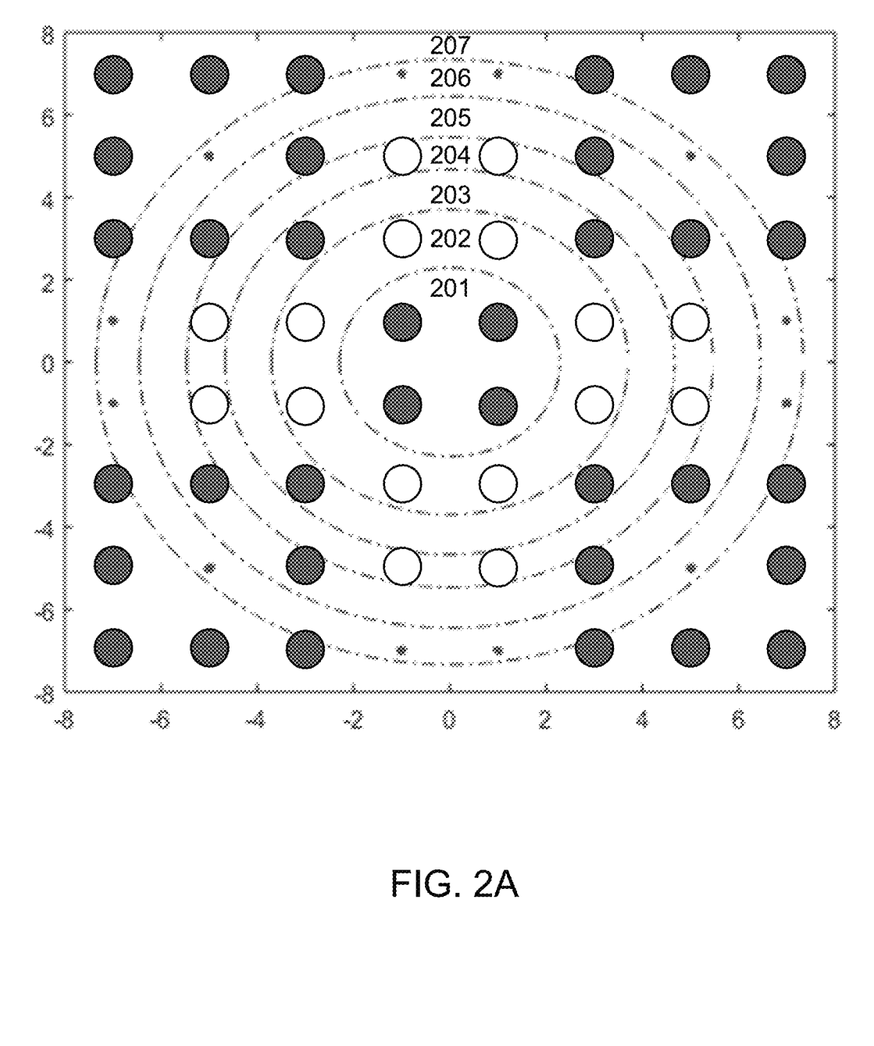
FIG. 2A represents an exemplary embodiment of the current disclosure wherein received symbols of a constellation are separated into regions according to their magnitude, i.e. their distance from the origin (radius) in the constellation, and regions are further classified into two sets A (shown by solid shading) and B (shown as white or unshaded) according to an exemplary embodiment of the disclosure.

Refer now to the exemplary embodiment of FIG. 2, the figure represents an exemplary embodiment of the current disclosure wherein received symbols are separated into regions according to their magnitude, i.e. their distance from the origin (radius) in the constellation, and regions are further classified into two sets A (solid shading) and B (unshaded). Set A is grouped in the corners and center of the constellation as shown based on the radii or rings selected. In turn, set B is grouped into a cross-like configuration as shown based on the radii or rings selected. In various embodiment, each group of selected points is arranged in a symmetric shape or pattern such as a square, rectangle, cross, T-shaped, rhombus, etc.

In various embodiments, groups of points in a constellation that share a common radius (or are disposed within a common ring) may selected based on a radius value. In some embodiments, the constellation is divided into two groups defined by different radii. For example, in FIG. 2A, one group of points (shaded/group A) is selected based on the inner most radius 201 and then moving outward skipping a radius 202 and then selecting another radius 203 and then repeating the pattern (skipping ring 204, selecting ring 205, skipping ring 206, and then selecting region 207) until the corners are reached and then including the corner points. The points left over form another group of points (unshaded points/group B) as shown in rings 202, and 204. Points in ring 206 may also be included in group B.

As plotted in FIG. 2A, received symbols are classified by radius |y| into separate regions 201-206 and each region is classified into two sets or groups A (solid shading) and B (unshaded). In various embodiments, nested regions 201-206 are bounded by two circles or ellipses and are annular or ring-shaped regions in some embodiments.

In various embodiments, the method of carrier frequency or frequency offset determination may include estimating the phase of the fourth power of the received symbols. In some embodiments, the symbols/points in a constellation may require a phase rotation. In some embodiments, the symbols/points in the unshaded set (Set B) are operated upon to rotate the phase by 180 degree. The phase angle θ for rotating points and symbols in the constellation as part of the estimation methods disclosed herein may be performed as follow:

θ=angle($y^4$), if $|y|^2 \in$ set A, shaded region and

θ=angle($y^4$)+π if $|y|^2 \in$ set B, unshaded region

This phase angle operation may can be implemented in hardware efficiently using CORDIC algorithm. In various embodiments, the CORDIC algorithm generates cos(θ) and sin(θ) u sing rotation matrices and avoids high delay DSP processing steps such as multiplication steps and exponentiation steps.

The carrier frequency offset can be estimated by finding the maximum magnitude of the L-point DFT or DFT length as $$\Delta f = \frac{1}{4}\mathrm{argmax}|DFT(\cos(\theta) + j\,\sin(\theta))|$$

Alternatively, we can implement the proposed algorithm by $$\Delta f = \frac{1}{4}\mathrm{argmax}|DFT(y^4/|y^4|)|$$

In various embodiments, L or the L-point corresponds to a length. In many embodiments, the L-point is the length of the DFT. Therefore, the magnitude of the DFT coefficients may be used as a normalized spectrum. In ASIC implementation such as a DSP, CORDIC algorithm is more efficient than normalization.

The number of symbols used for frequency offset estimation is 2048. They are divided into 8 groups of 256-point DFT calculations (i.e., L=256). The final output is the average of the magnitude of 8 DFT coefficients as shown in the third column in the following. Then the frequency offset is estimated by the maximum value of $|DFT(y_k^4)|$ or $|DFT(\exp(j\theta))|$. For PS32QAM and PS16QAM, the frequency offset is miscalculated by regular frequency estimation as pointed by the arrows in the figure. But, the proposed algorithm generates the peak with high SNR. In PS64QAM, both methods can correctly estimate the frequency offset, but the proposed algorithm has higher SNR.

Figure 2B:
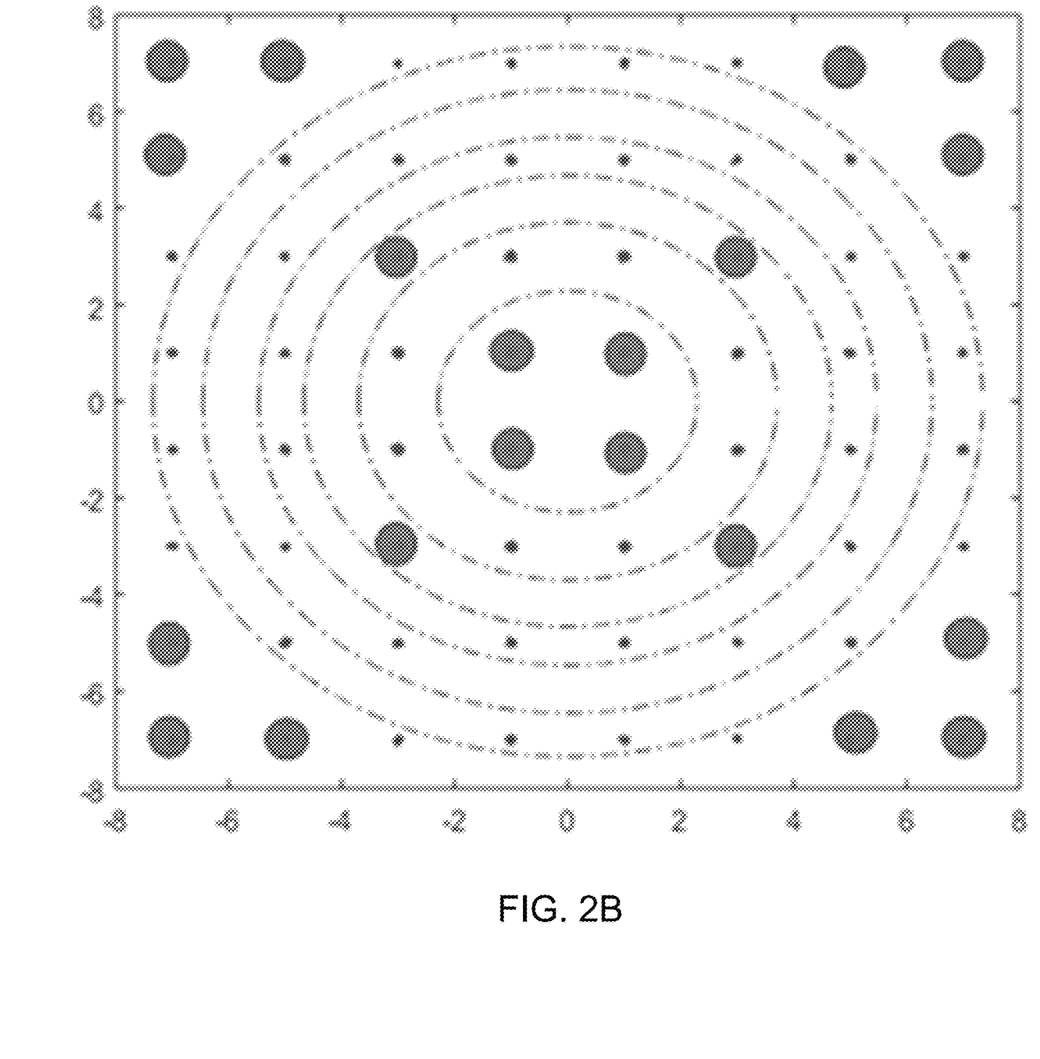
FIG. 2B shows the constellation of FIG. 2A after a selection or threshold has been applied such as through a DSP process to select a subset of set A according to an exemplary embodiment of the disclosure.

The table below enumerates the range of values that |y| may take within each region 201-206 as well as the set type (A or B) and the input to a DFT operation that may be used for frequency or phase compensation. For example, the symbol 1+1j belongs to the region 201 and set A as its fourth power is equal to −4. In addition, the symbol 1+3 j belongs to region 202 and set B as its fourth power has real value 28. FIG. 2B shows a subset of the symbols/points (shaded) of the constellation of FIG. 2A for PS64QAM.

Note that symbols in the region $(\sqrt{34}+\sqrt{50})/2<|y|\ll(\sqrt{50}+\sqrt{58})/2$ are not used because they cannot be uniformly assigned to one set A or B, i.e. the real part of the fourth power of the symbol may have either a negative or a positive value. The DFT input columns in the Table 2 below are discussed in more detail below. Symbols in set B contain in the DFT input either a factor of −1 or an additional term jπ to correct a 180 degree phase shift from being raised to the fourth power. The foregoing constraints can be used to select or exclude points from a given constellation when performing operations to estimate a frequency offset or other parameters disclosed herein.

TABLE 2

| Region | Received signal y | Set type | DFT input 1 | DFT input 2 |
|---|---|---|---|---|
| 201 | $|y| \ll \frac{\sqrt{2}+\sqrt{10}}{2}$ | A | $\frac{y^4}{|y^4|}$ | $\exp(j \bullet \mathrm{angle}(y^4))$ |
| 202 | $\frac{\sqrt{2}+\sqrt{10}}{2} < |y| \ll \frac{\sqrt{10}+\sqrt{18}}{2}$ | B | $-\frac{y^4}{|y^4|}$ | $\exp(j \bullet \mathrm{angle}(y^4)) + j\pi$ |
| 203 | $\frac{\sqrt{10}+\sqrt{18}}{2} < |y| \ll \frac{\sqrt{18}+\sqrt{26}}{2}$ | A | $\frac{y^4}{|y^4|}$ | $\exp(j \bullet \mathrm{angle}(y^4))$ |

TABLE 2-continued

| Region | Received signal y | Set type | DFT input 1 | DFT input 2 |
|---|---|---|---|---|
| 204 | $\frac{\sqrt{18}+\sqrt{26}}{2} < |y| \ll \frac{\sqrt{26}+\sqrt{34}}{2}$ | B | $-\frac{y^4}{|y^4|}$ | $\exp(j \bullet \text{angle}(4) + j\pi)$ |
| 205 | $\frac{\sqrt{26}+\sqrt{34}}{2} < |y| \ll \frac{\sqrt{34}+\sqrt{50}}{2}$ | A | $\frac{y^4}{|y^4|}$ | $\exp(j \bullet \text{angle}(y^4))$ |
| 206 | $\frac{\sqrt{34}+\sqrt{50}}{2} < |y| \ll \frac{\sqrt{50}+\sqrt{58}}{2}$ | N/A | N/A | N/A |
| 207 | $|y| > \frac{\sqrt{50}+\sqrt{58}}{2}$ | A | $\frac{y^4}{|y^4|}$ | $\exp(j \bullet \text{angle}(y^4))$ |

In most embodiments of the current disclosure, a DFT computation in CFE does not take the fourth power of the symbol $y^4$ as an argument but rather the normalized form $y^4/|y^4|$. Using the fourth power of the symbol $y^4$ as the argument to the DFT may generate unnecessary noise after the DFT due to the fact that $y^4$ may vary widely in the magnitude of the real part as shown, for example, in Table 1 where real($y^4$) takes values between −324 and 28. This amplitude noise has a bigger effect on a probabilistic shaped signal wherein the corner symbols have much smaller probability of occurrence. Thus, the carrier frequency offset may be represented as $$\Delta f = \frac{1}{4}\text{argmax}|DFT(y^4/|y^4|)|.$$

However, Applicant has realized that the division operation in the term $y^4/|y^4|$ may be a time consuming calculation in its hardware implementation. In various embodiments, reducing processing times in a DSP improves the ability to determine the frequency offset between the carrier frequency of the transmitter (and thus the frequency of the transmitted data) and the frequency that the receiver of the data is set. The delay associated with such as hardware-based division calculation prevents real-time operation of CFE in various embodiments. In many embodiments, the coordinate rotation digital computer (CORDIC) algorithm is used to address this delay. Specifically, CORDIC may be used to determine or generate the terms cos 0 and sin 0 in:

$$\Delta f = \frac{1}{4}\text{argmax}|DFT(\cos\theta + j\,\sin\theta)| = \frac{1}{4}\text{argmax}|DFT(e^{j\theta})|$$

which yields an equivalent result in a much faster time. The result is equivalent since $$\frac{y^4}{|y^4|} = e^{j\theta} = \exp(j \cdot \text{angle}(y^4)).$$

In most embodiments, the CORDIC algorithm computes the complex argument $e^{j\theta}$ to the DFT for CFE in an efficient hardware implementation. In various embodiments, the CORDIC algorithm includes steps or operations performed interactively such as to cause iterative angle rotations. As CORDIC operates the iterative rotations converge to the estimated angle value. CORDIC is an iterative algorithm for the calculation of the rotation of a two-dimensional vector $z=[\text{Re}(z), \text{Im}(z)]$ using add and shift operations, where, in the current disclosure, $z=y^4$. In some embodiments, the CORDIC algorithm uses a series of rotation matrices to determine sin and cosine values in an efficient manner. Refer now to the exemplary embodiment of FIG. 3, wherein the CORDIC algorithm iteratively calculates a rotation angle $\theta$ of the complex number $z=e^{j\theta}$. In every iteration k=1, 2, 3, ..., N of N iterations an angle $\alpha_k = \pm\arctan(2^{-k}) = [26.5651, 14.0362, 7.1250, 3.5763, 1.7899, 0.8956, ...]$ in degrees is subtracted from or added to the remainder angle as the angle approaches zero as illustrated below.

Figure 3:
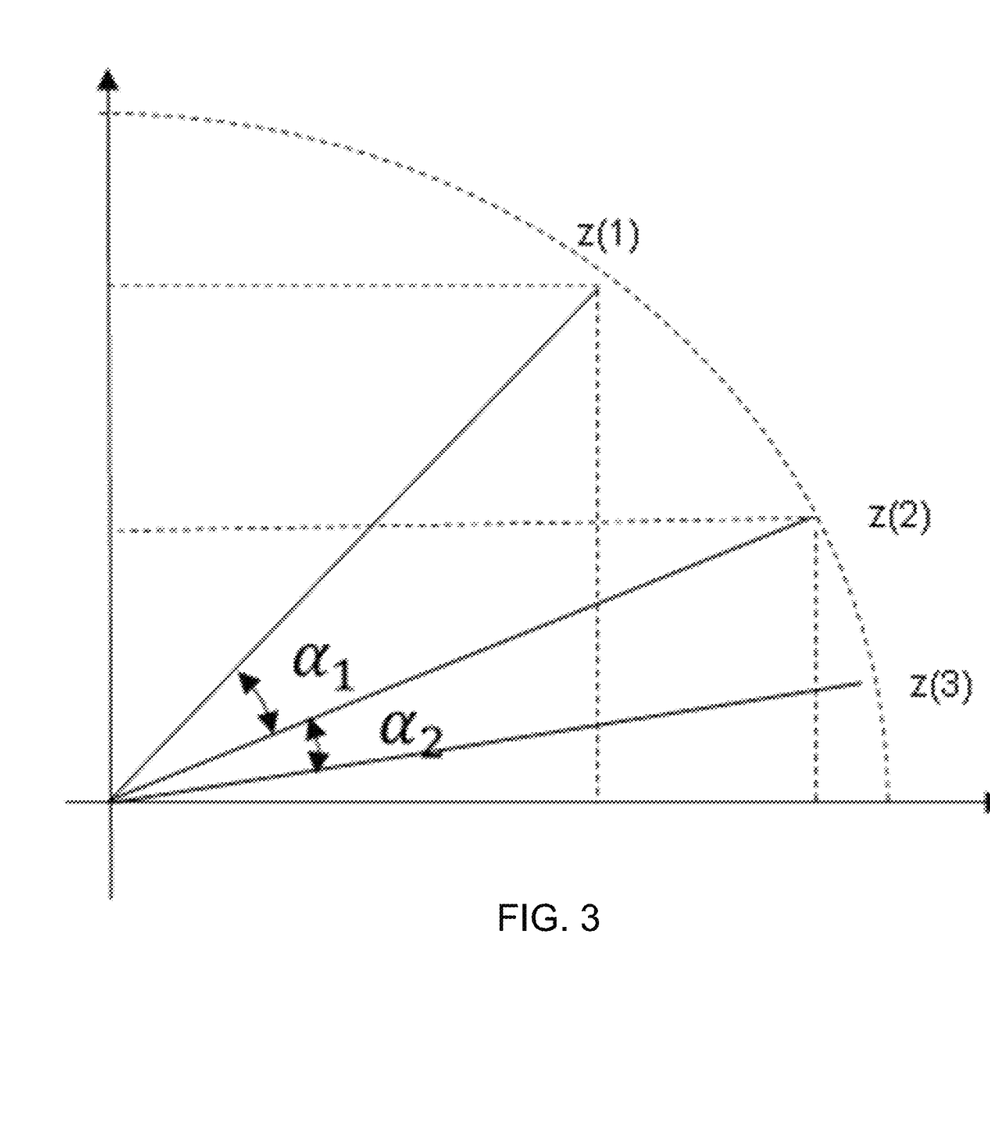
FIG. 3 represents an exemplary embodiment of the current disclosure wherein a phase angle of a complex number $e^{j\Theta}$ is determined with the coordinate rotation digital computer algorithm according to an exemplary embodiment of the disclosure.

In some embodiments, in every iteration k=1,2,3, ..., N, if $\text{Im}(z_k)>0$, then the angle is rotated clockwise: $\text{Re}(z_{k+1}) = \text{Re}(z_k) + \text{Im}(z_k)2^{-k}$ $$Im(z_{k+1})=Im(z_k)-Re(z_k)2^{-k}$$

$$\theta_{k+1}=\theta_k-\arctan(2-k).$$

If $\text{Im}(z_k) \leq 0$ then the angle is rotated anticlockwise:

$$Re(z_{k+1})=Re(z_k)-Im(z_k)2^{-k}$$

$$Im(z_{k+1})=Im(z_k)+Re(z_k)2^{-k}$$

$$\theta_{k+1}=\theta_k-\arctan(2-k).$$

In the algorithm, the exponential function of rotation angle $e^{j\theta}$ can be found from a look up table (LUT). The LUT and CORDIC steps may be implemented in a DSP or other hardware to improve the calculation time of $y^4/|y^4|$ and thereby improve the accuracy of CFE. The ability to determine a carrier offset faster supports real time frequency offset determining and matching receiver frequency to transmitter frequency. In turn, this reduces errors and improves the efficiency of data transmission while reducing costs associated with other corrective systems and methods. In various embodiments, the use of CORDIC as disclosed herein supports real time determination of CFE and/or determination of CFE by leveraging matrix rotations to reduce latency when determining $y^4$ and outputs and intermediate calculations using $y^4$.

Figure 4:
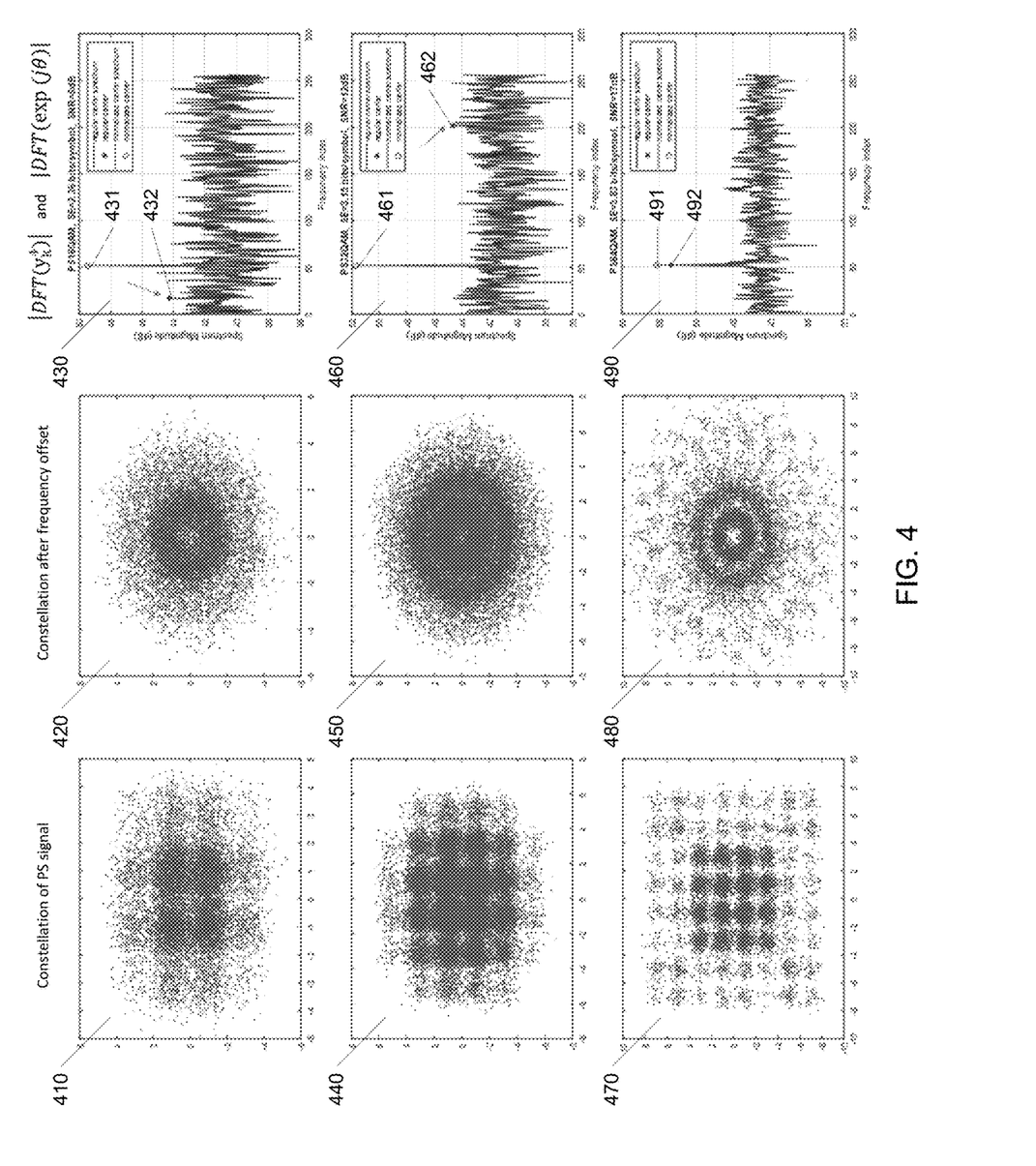
FIG. 4 represents an exemplary embodiment of the current disclosure wherein three simulated constellations of various PS-QAM signals without frequency offsets are illustrated according to an exemplary embodiment of the disclosure.

Refer now to the exemplary embodiment of FIG. 4. FIG. 4 represents an exemplary embodiment of the current disclosure wherein three simulated constellations 410, 440, 470 of various PS-QAM signals without frequency offsets are illustrated. Associated constellations 420, 450, 480 illustrate the same signals after a frequency offset has been applied. Associated carrier frequency spectra 430, 460, 490 derived from carrier frequency/carrier offset estimation and carrier phase estimation methods of the current disclosure are also illustrated both for normalized N and non-normalized symbols NNS, wherein the estimated carrier frequency may be a frequency at which a peak in a spectrum occurs. Associated carrier frequency spectra 430, 460, 490 are also shown in an enlarged format in FIGS. 5A, 5B, and 5C respectively.

A simulated constellation 410 of a PS16QAM signal with SNR about 2 dB higher than the Shannon limit, a simulated constellation 440 of a PS32QAM signal with SNR about 2 dB higher than the Shannon limit, and a simulated constellation 470 of a PS64QAM signal about 5 dB higher than the Shannon limit all have weak corner symbols. Constellations 420, 450, 480 of the same signals after carrier frequency offset have samples separable according by radius lye, i.e. these constellations are axisymmetric about the origin.

In some embodiments, frequency spectra 430, 460, 490 after carrier frequency compensation methods of the current disclosure are sharply peaked around the expected carrier frequency when symbols are exponentiated and normalized but not necessarily peaked at the expected carrier frequency when symbols are exponentiated but not normalized. In some embodiments, the number of symbols used for frequency offset estimation is 2048. In various embodiments, to determine or generate the frequency spectra, symbols are divided into 8 groups of 256-point DFT calculations. Each frequency spectrum is drawn based on the average of the magnitude of 8 sets of DFT coefficients at each frequency index. In many embodiments, the frequency offset, i.e. the frequency index at which the maximum DFT coefficient is expected to occur, is estimated by the maximum value of $|DFT(y^4)|$ (exponentiated and unnormalized symbols) or $|DFT(\exp(j\theta))|$ (exponentiated and normalized symbols).

Figure 5A:
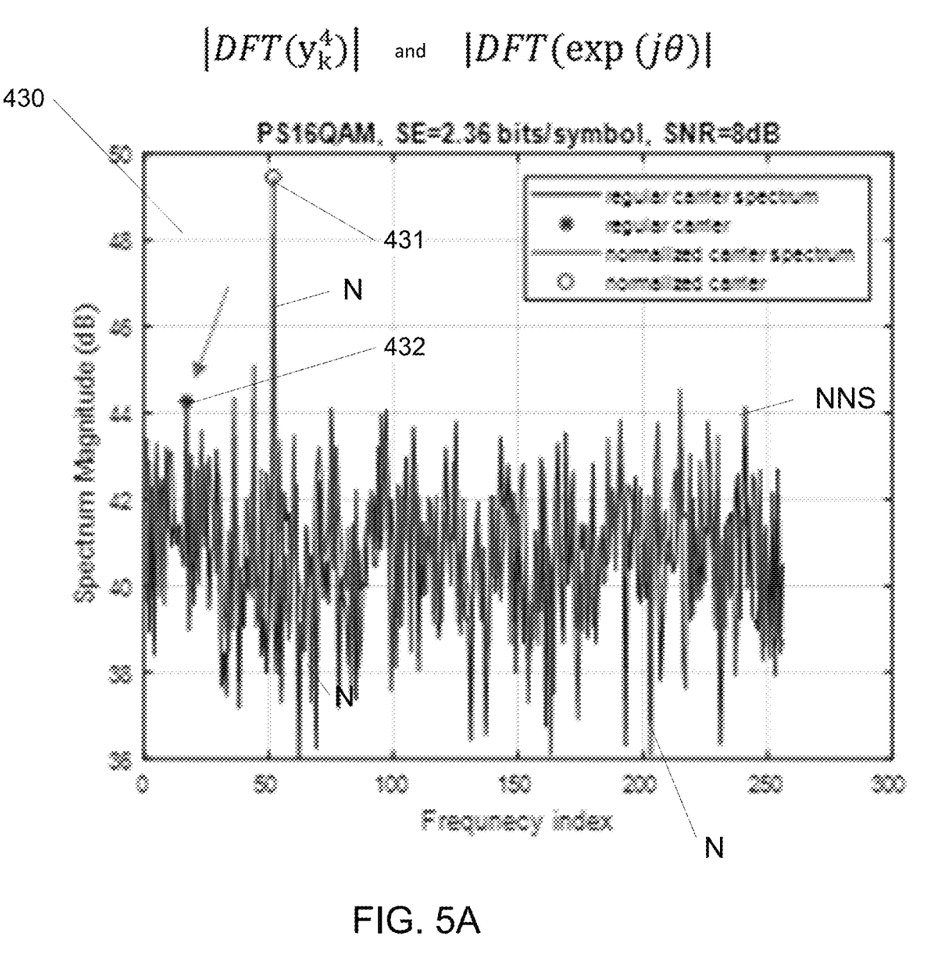
FIGS. 5A, 5B, and 5C show expanded views of the leftmost plots of FIG. 4 that correspond to associated carrier frequency spectra of the various PS-QAM signals of FIG. 4 according to an exemplary embodiment of the disclosure.
Figure 5B:
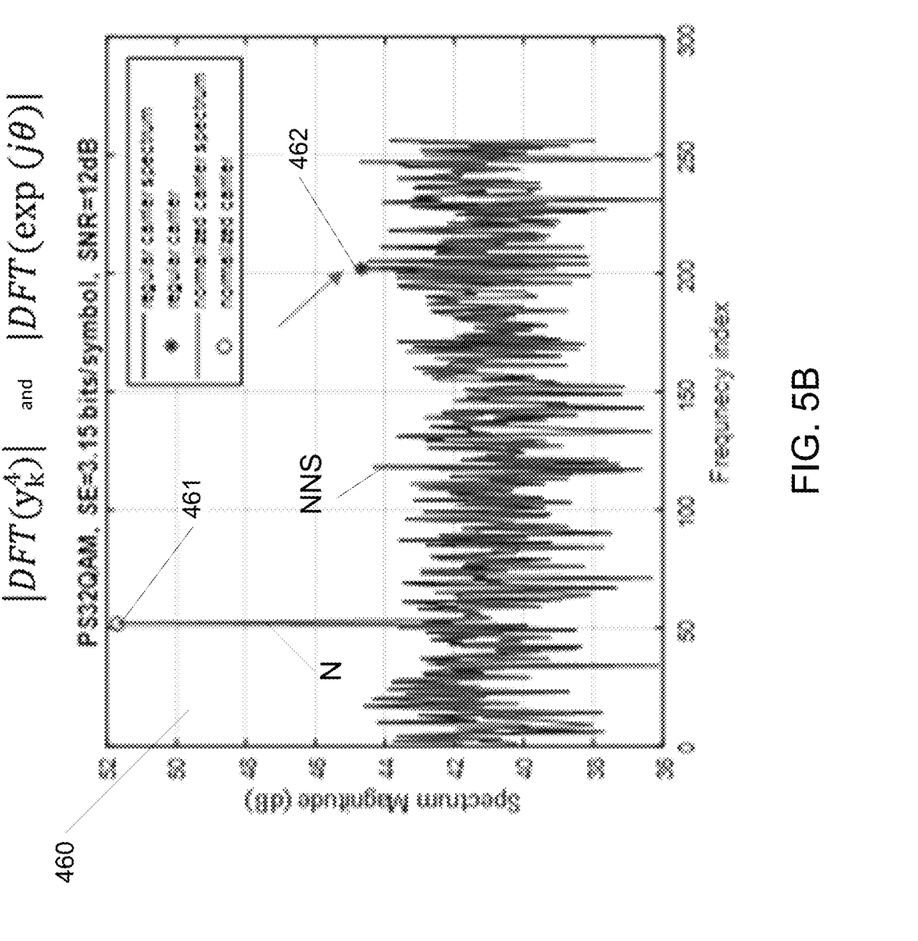
Figure 5C:
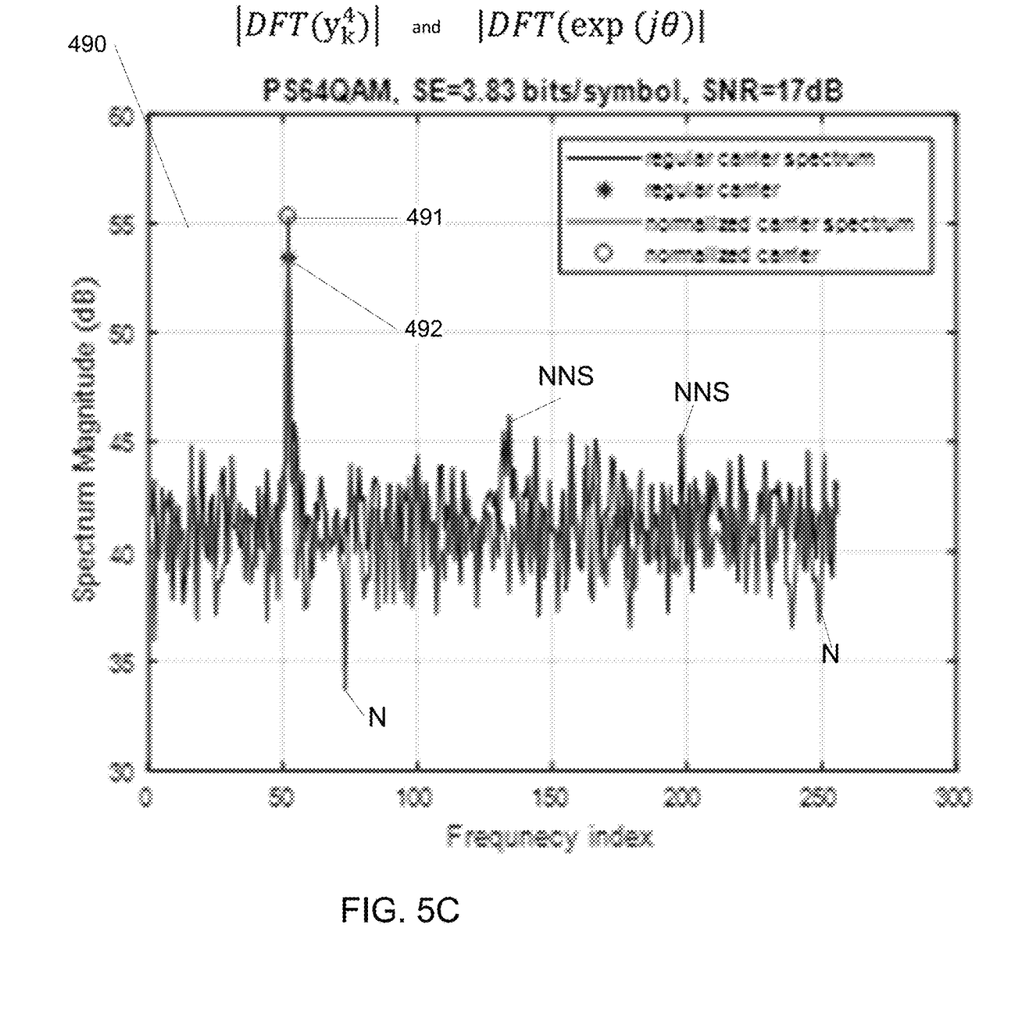

In some embodiments, a sharp peak 431 of high SNR is visible in a spectrum of frequency-compensated, normalized, and exponentiated PS16QAM symbols, but a peak 432 of weak SNR is barely detectible above the background in a spectrum of frequency-compensated, unnormalized, and exponentiated PS16QAM symbols. In some embodiments, a sharp peak 461 of high SNR is visible in a spectrum of frequency-compensated, normalized, and exponentiated PS32QAM symbols, but a peak 462 of weak SNR is barely detectible above the background in a spectrum of frequency-compensated, unnormalized, and exponentiated PS32QAM symbols. In some embodiments, a sharp peak 491 of high SNR is visible in a spectrum of frequency-compensated, normalized, and exponentiated PS64QAM symbols, and a peak 492 of weaker SNR is visible in a spectrum of frequency-compensated, unnormalized, and exponentiated PS64QAM symbols. Peaks 431, 461, 491 in spectra of normalized symbols are all centered around the expected DFT frequency index; peaks 432, 462, 492 in spectra of unnormalized symbols are not all centered around the expected DFT frequency index or any consistent frequency index.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of carrier frequency estimation comprising:
   selecting a first group of symbols from a constellation of a carrier signal;
   estimating a carrier frequency or carrier frequency offset of the carrier signal by approximating the carrier frequency offset as $\Delta f$; and
   determining $\cos(\theta)$ and $\sin(\theta)$ using an algorithm, wherein the algorithm calculates rotation of a two-dimensional vector by $\theta$, wherein $\Delta f$ is determined using one or both of $\cos(\theta)$ and $\sin(\theta)$.

2. The method of claim 1 further comprising selecting symbols of the first group of symbols by a magnitude of a complex representation of each symbol.

3. The method of claim 1 further comprising selecting symbols of the first group of symbols by a sign of real part of fourth power of the symbol of each symbol, wherein one or more symbols are a complex number.

4. The method of claim 1, wherein all steps of claim 1 are performed by a DSP that is in electrical communication with a symbol rate receiver.

5. The method of claim 4, wherein $e^{j\theta}$ is evaluated as a step in the algorithm.

6. The method of claim 5, wherein values for $e^{j\theta}$ are obtained by a DSP from a look up table stored in memory, wherein the memory is in electrical communication with the DSP and a receiver.

7. The method of claim 1, wherein $$\Delta f = \frac{1}{4}\mathrm{argmax}\,|DFT(\cos(\theta) + j\sin(\theta))|.$$

8. The method of claim 1, wherein $$\Delta f = \frac{1}{4}\mathrm{argmax}\,|DFT(e^{j\theta})|.$$

9. The method of claim 1 wherein the first group includes one or more subgroups of symbols from the constellation.

10. The method of claim 9 wherein the one or more subgroups includes a plurality of corner symbols, wherein the estimating and determining step are performed in real time.

11. The method of claim 10 further comprising selecting symbols of the first group of symbols from first radius of the constellation.

12. The method of claim 1 wherein the algorithm is a coordinate rotation digital computer (CORDIC) algorithm.

13. The method of claim 12 further comprising estimating phase angle $\theta$ of first group of symbols wherein $\theta=\mathrm{angle}(y^4)$ using CORDIC algorithm to generate $\cos(\theta)$ and $\sin(\theta)$ using a DSP in electrical communication with a receiver, wherein $|y|^2$ is in a first region of constellation.

14. The method of claim 12 further comprising estimating phase angle $\theta$ of first group of symbols wherein $\theta=(\mathrm{angle}(y^4)+\pi)$ using CORDIC algorithm to generate $\cos(\theta)$ and $\sin(\theta)$ using a DSP in electrical communication with a receiver, wherein $|y|^2$ is in a second region of constellation.

15. The method of claim 12, wherein the CORDIC algorithm is performed using a DSP.

16. The method of claim 15, wherein the DSP is a coherent DSP.

17. The method of claim 15, wherein the DSP is in electrical communication with a receiver.

18. The method of claim 15, wherein the DSP is a symbol rate DSP.

19. The method of claim 12, wherein CORDIC algorithm is configured not to perform division or multiplication operations to maintain real time operation.

20. A method of carrier frequency estimation comprising:
selecting a first group of symbols from a constellation of a carrier signal, wherein the first group includes one or more subgroups of symbols from the constellation;
estimating a carrier frequency or carrier frequency offset of the carrier signal by approximating the carrier frequency offset as $\Delta f$, wherein $\Delta f$ is a function of $\theta$; and
determining $\cos(\theta)$ and $\sin(\theta)$.

21. The method of claim 20 wherein $\cos(\theta)$ and $\sin(\theta)$ are determined using an algorithm, wherein the algorithm is a CORDIC algorithm, wherein the CORDIC algorithm calculates rotation of a two-dimensional vector by $\theta$.

22. A method of carrier frequency estimation comprising:
selecting a first group of symbols from a constellation of a carrier signal;
determining a rotation of a two-dimensional vector by $\theta$; and
estimating a carrier frequency or carrier frequency offset of the carrier signal by approximating the carrier frequency offset as $\Delta f$, wherein $\Delta f$ is a function of $\theta$.

* * * * *

UNITED STATES PATENT AND TRADEMARK OFFICE
CERTIFICATE OF CORRECTION

Page 1 of 2

PATENT NO. : 12,328,213 B1
APPLICATION NO. : 17/581700
DATED : June 10, 2025
INVENTOR(S) : Hongbin Zhang It is certified that error appears in the above-identified patent and that said Letters Patent is hereby corrected as shown below:

In the Specification

Under Column no. 4, Line no. 56, Replace:
"lye."
With:
--$|y|$.--

Under Column nos. 7-8, Line no. 3 (Approx.) (TABLE 2-continued), Replace:
"(4)"
With:
--$(y^4)$--

Under Column no. 7, Line no. 46, Replace:
"0 and sin 0"
With:
--$\theta$ and sin $\theta$--

Under Column no. 9, Line no. 10, Replace:
"lye."
With:
--$|y|$.--

In the Claims

Under Column no. 10, Claim 5, Line no. 66, Replace:
"$e^{j\theta}$is"
With:
--$e^{j\theta}$ is--

Signed and Sealed this
Thirtieth Day of September, 2025

John A. Squires
*Director of the United States Patent and Trademark Office*

CERTIFICATE OF CORRECTION (continued)
U.S. Pat. No. 12,328,213 B1

Under Column no. 11, Claim 6, Line no. 1, Replace:
"$e^{j\theta}$are"
With:
--$e^{j\theta}$ are--